UNITED STATES PATENT OFFICE.

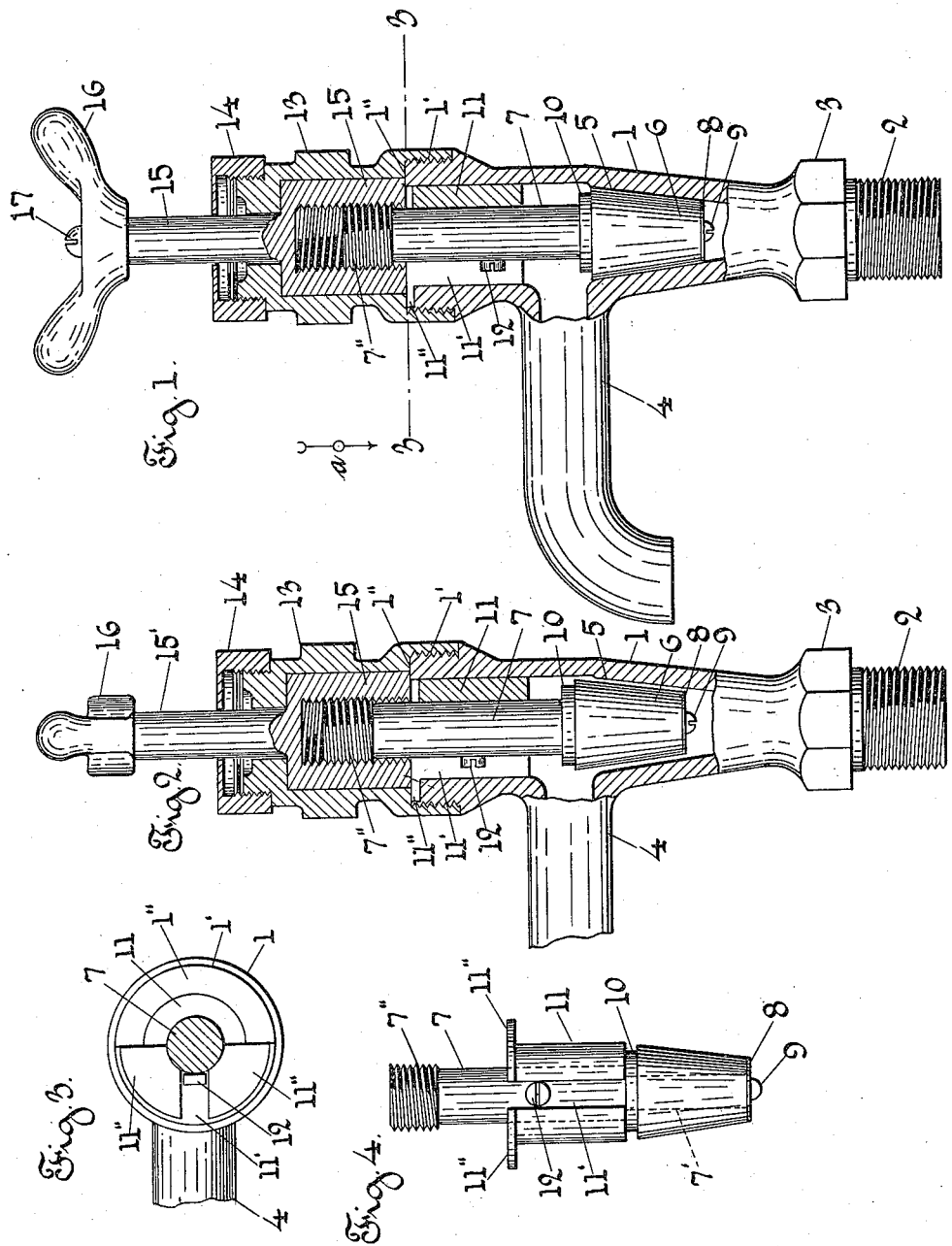

JOSEPH JEANNOTTE, OF WOONSOCKET, RHODE ISLAND.

STOP-COCK.

1,160,176.   Specification of Letters Patent.   Patented Nov. 16, 1915.

Application filed April 23, 1915. Serial No. 23,327.

*To all whom it may concern:*

Be it known that I, JOSEPH JEANNOTTE, a citizen of the United States, residing at Woonsocket, in the county of Providence and State of Rhode Island, have invented certain new and useful Improvements in Stop-Cocks, of which the following is a specification.

My invention relates to stop cocks, and particularly to stop cocks for faucets, which are used to admit water to set basins, etc., and more particularly to that class of stop cocks in which the valve is raised and lowered on its seat, without any rotary motion, to admit, or shut off the flow of water, or other liquid.

The object of my invention is to provide an improved stop cock of the class referred to, of simple construction and operation, and which can be readily taken apart and assembled, and which is preferably provided with an elongated cone shaped valve, and has loosely mounted on the valve stem a lock collar, through which the valve stem is raised and lowered; said lock collar is in this instance provided with a slot therein, into which extends in this instance a stud or screw on the valve stem, to prevent the turning of the valve stem and the valve thereon, as the valve is opened or closed.

My invention consists in certain novel features of construction of my improvements in stop cocks, as will be hereinafter fully described.

Referring to the drawing:—Figure 1 is a side view and partial section of a stop cock embodying my improvements, showing the valve in closed position. Fig. 2 corresponds to Fig. 1, but shows the valve in its open position. Fig. 3 is a section, on line 3, 3, Fig. 1, looking in the direction of arrow *a*, same figure. Fig. 4 shows the valve, the valve stem, and lock washer, detached.

In the accompanying drawing are shown my improvements in stop cock, combined with a faucet, to be used to admit water to basins, etc. The faucet proper consists in this instance of the body portion 1, having an inlet screw threaded end 2, for connection with a service pipe, etc., and the hexagonal portion 3, furnishing an engaging surface for a wrench, or other tool, and the outlet or delivery pipe 4.

Within the body portion 1 is the valve seat 5, which in this instance is cone shaped, and about an inch in length. The upper part of the body 1 is screw threaded at 1'.

The above mentioned parts may be of the usual construction, except that the valve seat 5 is of considerable length, to furnish a long seat or bearing for the valve.

I will now describe my improvements in stop cock, which in this instance are combined with the faucet parts shown in the drawing, and above described.

The valve 6 is of cone shape, and of elongated construction, corresponding with the shape and length of the seat 5. The valve 6 is preferably of rubber, or leather, or other flexible material, and preferably has a central opening therethrough, through which extends the lower reduced end 7' on the valve stem 7, shown by broken lines in Fig. 4. There is a thin washer 8 at the lower end of the valve 6, and a screw 9 extends through a hole in said washer, and into a threaded hole in the lower reduced end 7' on the stem 7, and acts to secure the valve 6 on said reduced end 7'. A loose washer 10 is mounted on the reduced end 7' of the stem 7, and extends between the upper end of the valve 6 and the enlarged portion of the stem 7. Loosely mounted on the stem 7 is a collar 11, termed a lock collar, which has a vertically extending slot 11' through one side thereof, and two horizontal lips or segmental flanges 11'', extending out at right angles, on the upper edge of the collar 11, one on each side of the slot 11' and extending around one-half of the periphery of the collar 11, as shown in Fig. 3. The outer edge of the lips 11'' are of circular shape, as shown in Fig. 3.

A screw or stud 12 is secured to the stem 7, and extends in the slot 11' in the collar 11, and is adapted to move freely up and down in said slot, as the stem is raised or lowered. The screw stud 12 affords a lateral projection on the valve stem. The upper end of the stem 7 is screw threaded, as shown at 7'', Fig. 4. The upper screw threaded end 1' of the faucet body has one-half of its upper edge in a higher plane than the other half, as shown at 1'' in Figs. 1 and 2, and when the parts are assembled, and the lock collar 11 is placed in the upper end of the body portion 1 of the faucet, the lips or flanges 11'' will fit into and extend in the cut-out or lower portion on the upper end of the body 1 of the faucet, and the inner edges of said lips or flanges will bear against the ends of the raised semi-circular rib or projection 1″ on said upper end, the said flanges abutting against the ends of said rib or projection, as shown in Fig. 3, so that said ends will serve as stops to prevent the collar 11 from turning within the body portion of the faucet.

Upon the upper screw threaded end 1′ of the body portion 1 of the faucet is detachably secured a cap 13, said cap 13 is provided with a screw thread within its lower end, and said cap is also provided, in this instance on its central portion, with a surface having flat sides thereon for engagement with a wrench, or other tool, for securing the cap in place. The upper end of the cap 13 is in this instance provided with a screw thread, on which is screwed the nut 14 made in the form of a cap and affording a finish for the upper end of the faucet.

Within the cap 13 loosely extends a socket 15, which rests at its lower end on the upper edge of the screw threaded end 1″ of the body portion 1 of the faucet, and on the lips 11″ on the lock collar 11, shown in Figs. 1 and 2. Within the socket 15 is a screw thread, which is adapted to engage the screw thread 7″ on the stem 7.

Extending up from the socket 15 and through the upper end of the cap 13 and likewise through the flange of the nut or cap 14 is the stem 15′, for rotating said socket 15. On the upper end of the stem 15′ is secured a handle 16, in this instance by a screw 17; the handle 16 has a square shaped opening therethrough, which fits onto a square shaped end on the upper end of the stem 15′.

From the above description in connection with the drawings the operation of my stop cock will be readily understood by those skilled in the art.

The socket 15 is rotated by means of the handle 16 on the stem 15′. The rotation of the socket 15 causes, through the engagement of the thread 7″ on the valve stem 7 with the thread within said socket, the raising and lowering of the valve stem 7 and the valve 6 attached to its lower end, and the stud or screw 12, extending into the slot 11′ in the lock collar 11, prevents the rotation of said stem 7 and valve 6.

When the handle 16 is turned in one direction, the valve stem 7 and valve 6 are moved down to engage with the seat 5, as shown in Fig. 1, to shut off the passage of water or liquid through the faucet. When the handle 16 is turned in the opposite direction, the valve stem 7 and valve 6 are raised and disengaged from the seat 5, as shown in Fig. 2, to allow the passage of water or other liquid through the faucet, all as will be readily understood by those skilled in the art.

The advantages of my improvements will be readily appreciated.

The several parts of the stop cock are few in number and inexpensive to manufacture, and are readily assembled, and may be combined with any faucet body of ordinary shape and construction.

By means of the lock collar 11, which extends loosely within the upper end of the faucet body, and is positively held from turning therein, the valve stem and valve are prevented from having a rotary motion, as the valve is opened and closed.

It will be understood that the details of construction of my improvements may be varied if desired.

Having thus described my invention, what I claim as new and desire to secure by Letters Patent is:—

In a faucet, the combination with a body portion having inlet and outlet passages, a valve seat, and at its top a raised curved rib or projection, of a valve fitting said seat, a stem carrying said valve and having a screw threaded upper end and a lateral projection, a cap screwed to the upper end of said body portion, a rotatable and internally threaded socket within said cap and engaging the threaded upper end of said valve stem, said socket having a stem extending upward through the top of said cap and being provided with a handle by which it may be turned, a lock collar within the upper part of said body portion of the faucet, said collar having a vertical slot receiving the said lateral projection on the valve stem, said collar having also horizontal lips or segmental flanges abutting against the ends of said curved rib or projection on the said body portion; whereby the said collar will be locked from turning in the body portion of the faucet and the said valve stem be prevented from turning in the said collar as said valve stem is raised or lowered to open or close the valve.

JOSEPH JEANNOTTE.

Witnesses:
 EVA T. FOURNIER,
 EUGÉNE L. JALBERT.

Copies of this patent may be obtained for five cents each, by addressing the "Commissioner of Patents, Washington, D. C."